United States Patent
Hale

[11] B 3,985,040
[45] Oct. 12, 1976

[54] HAND AND FOOT GOVERNOR CONTROL SYSTEM

[75] Inventor: Richard A. Hale, Downers Grove, Ill.

[73] Assignee: International Harvester Company, Chicago, Ill.

[22] Filed: Nov. 21, 1974

[21] Appl. No.: 525,809

[44] Published under the second Trial Voluntary Protest Program on February 24, 1976 as document No. B 525,809.

[52] U.S. Cl. .................................... 74/482
[51] Int. Cl.² ................ G05G 11/00; G05G 1/14
[58] Field of Search ............ 74/479, 480 R, 480 B, 74/481, 482

[56] References Cited
UNITED STATES PATENTS

| | | |
|---|---|---|
| 1,308,707 | 7/1919 | Gross .................................... 74/482 |
| 1,364,113 | 1/1921 | Johnson ............................ 74/482 X |
| 1,398,625 | 11/1921 | Clough ................................ 74/482 |
| 1,549,719 | 8/1925 | Henke ................................. 74/482 |
| 2,185,170 | 1/1940 | Armstrong ........................... 74/481 |
| 3,535,951 | 10/1970 | Larson et al. ........................ 74/482 |

*Primary Examiner*—Allan D. Herrmann
*Attorney, Agent, or Firm*—William H. Wendell; Floyd B. Harman

[57] ABSTRACT

A control system for controlling the engine governor on a tractor or like vehicle utilizing hand and foot throttles link-connected to the governor for control thereof without interaction between the throttles. Each throttle connects to the governor by separate linkage incorporating a flexible cable capable of transmitting tension but not a compression load enabling a tensioning of one cable through a manipulation of the associated throttle with the cable link of the second throttle going slack and transmitting no motion to the second throttle.

8 Claims, 4 Drawing Figures

HAND AND FOOT GOVERNOR CONTROL SYSTEM

The present invention generally relates to a control system for the power control unit of the engine of a prime mover such as an agricultural tractor or the like. More particularly, the system herein is concerned with the control of a vehicle engine governor through the utilization of a hand throttle and a foot throttle, each operable for independent control of the governor without interaction with the other.

While combined hand and foot governor control systems are generally known, such systems, for the most part, utilize elaborate interrelated linkage systems requiring mutual over-riding operation and the attendant operational and maintenance difficulties arising from the interaction between the hand and foot assemblies.

It is a primary object of the invention herein to provide a system for dual hand and foot control, normally utilizing a hand lever or throttle and a foot pedal or throttle, wherein any substantial mechanical interaction therebetween is avoided. In doing so, a system is achieved which, while relatively simple in structure and operation, is efficient, highly practical, economical and presents no maintenance problems.

Basically, an elongated rigid link is pivotally engaged at one end to the governor control arm or the like which is normally spring biased into an idle position or setting. The second end of the rigid link pivotally engages a bell crank which is in turn connected to a pair of separate outwardly projecting flexible links, each capable of transmitting a tensile load, but not a compressive load. A first one of the flexible links has the remote end thereof fixed to a link rigid with the lower end of the rotatably mounted hand lever or throttle in a manner whereby a rotation of the hand throttle will effect a tensioning of the flexible link, a pivotal rotation of the bell crank and a movement of the governor control arm so as to move the governor setting and advance the engine rpm. The second flexible link has the remote end thereof engaged with a second bell crank which, by means of a second rigid link, is pivotally engaged with a pivotally mounted foot throttle or pedal whereby a depression of the foot throttle will, through the second bell crank and flexible link, pivot the first mentioned bell crank and likewise move the governor control arm against the biasing action of the associated spring so as to change the setting of the governor.

As will be appreciated, in each instance, the flexible cable link associated with the actuated throttle will, through a tensioning thereof, control the governor with the other flexible link going slack so as to avoid an interaction between the throttles. The hand throttle will have a friction device of conventional construction associated therewith so as to maintain the hand throttle in any adjusted position thereby enabling the provision of an adjusted governor setting which can be overridden by the foot throttle so as to temporarily increase the governor setting while still providing for a return to the hand throttle setting upon a release of the foot throttle.

Additional objects and advantages residing in the details of construction and operation of the invention as more fully hereinafter described and claimed will become apparent.

Reference is had to the accompanying drawings forming a part hereof wherein like numerals refer to like parts throughout, and in which.

Figure 1:
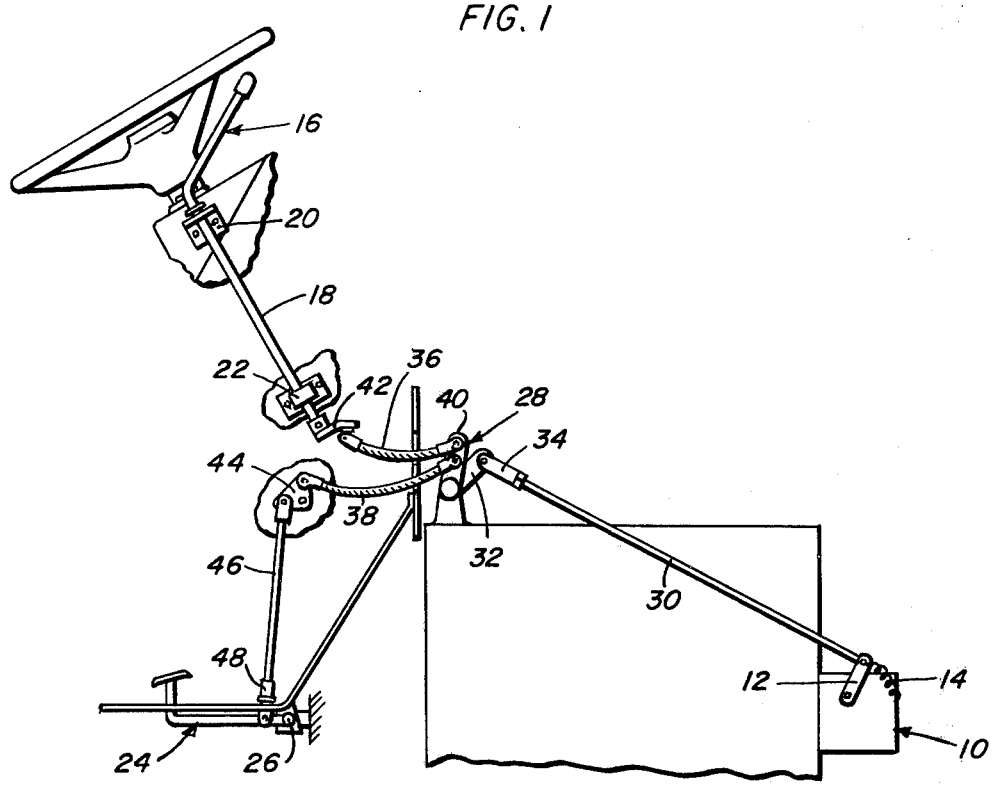
FIG. 1 is a schematic view of the control system with both the hand and foot throttles in idle position.

Referring now more specifically to the drawings, the power control unit, in the illustrated example a governor, is designated by reference numeral 10 and includes a projecting control arm or the like 12 spring biased into an idle position, as illustrated in FIG. 1, by an appropriate internal or external spring means 14. A hand lever or throttle 16 is mounted in an accessible position within the cab of the vehicle, normally adjacent to or immediately underlying the steering wheel. This hand throttle includes an elongated shaft rotatably mounted within appropriate bracket means 20 and has a conventional friction device 22 associated therewith so as to releasably retain the hand throttle 16 in any rotatably adjusted position. A foot pedal or throttle 24, also positioned for easy access within the cab of the vehicle, is pivotally mounted for vertical movement by appropriate bracket means 26.

A first bell crank 28 is pivotally mounted at an appropriate location between the two throttles 16 and 24 and the governor 10. A single elongated rigid link or rod 30 extends between and is pivotally connected at the opposite ends thereof to the governor control arm 12 and one arm 32 of the bell crank 28. The pivotal connection to the arm 32 of the bell crank 28 can be by means of a threaded clevis 34 so as to enable an adjustment of the linkage. A pair of flexible cables or cable links 36 and 38, preferably of stranded non-jacketed cable, are individually pivotally connected to the second bell crank arm 40 and extend outwardly therefrom in spaced relation to each other. These flexible cable links 36 and 38 are non-extensible and, due to the flexible nature thereof, able to transmit only a tension load and not a compression load.

The cable link 36, at the second end thereof, is pivotally engaged with the outer end of a short rigid link 42 affixed to and extending radially from the lower portion of the hand throttle shaft 18. This link 42, in the idle position of the governor 10 as illustrated in FIG. 1, will normally project radially toward and in alignment with the cable link 36 and bell crank 28 with the cable link 36 maintained extended but not tensioned. A rotation of the hand throttle 16, moving from the full line position to the phantom position in FIG. 4, or from the position of FIG. 1 to the position of FIG. 3, will effect a tension pull on the cable link 36, bell crank 28 and link 30 so as to move the governor control arm 12 against the biasing force of spring 14 and thus change the governor setting. The hand throttle 16 will be automatically maintained in any adjusted position by the friction device 22 until manually moved therefrom.

The second flexible cable link 38 extends from the bell crank arm 40 to a second pivotally mounted bell crank 44. A rigid link 46 is pivotally connected at one end to the bell crank 44 and extends therefrom to an intermediate portion of the foot throttle or lever, being adjustably engaged therewith by an appropriate threaded clevis 48. In the idle position of the governor 10, the biasing spring thereof will maintain the cable link 38 under sufficient tension so as to maintain the foot throttle 24 elevated. Upon a physical depressing of the foot pedal 24, as illustrated in FIG. 2, the links 46, 38 and 30 will be tensioned and the control arm 12 on the governor 10 moved against the biasing force of the governor spring so as to change the setting thereof.

Figure 2:
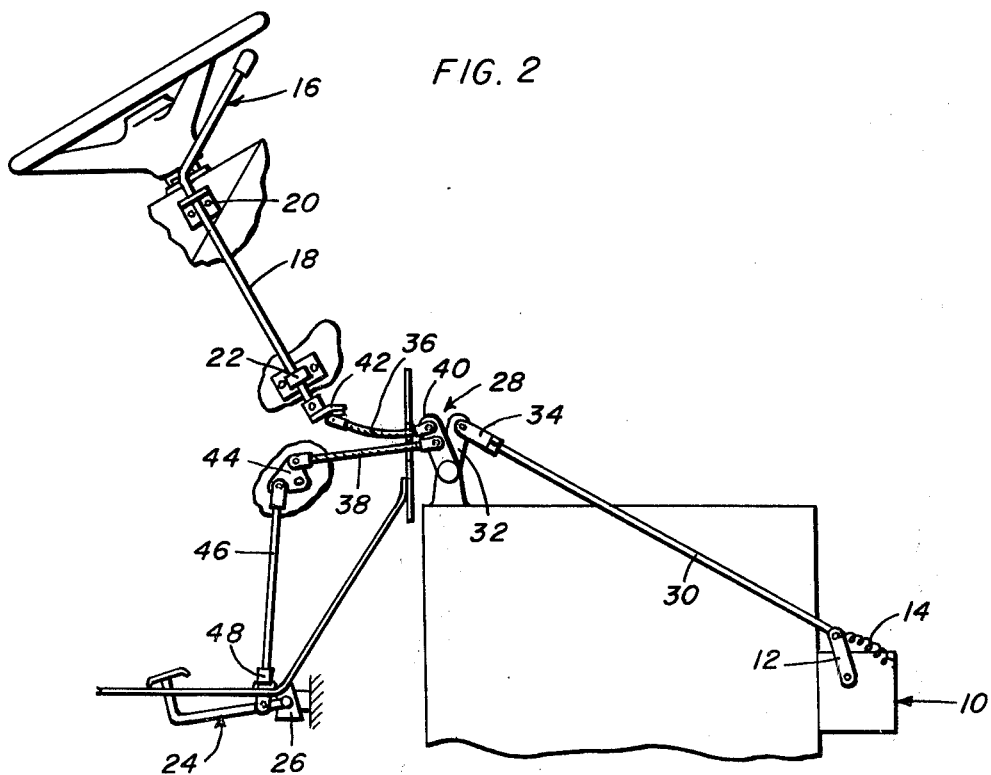
FIG. 2 is a schematic view of the system with the hand throttle in idle position and the foot throttle in full throttle position.
Figure 3:
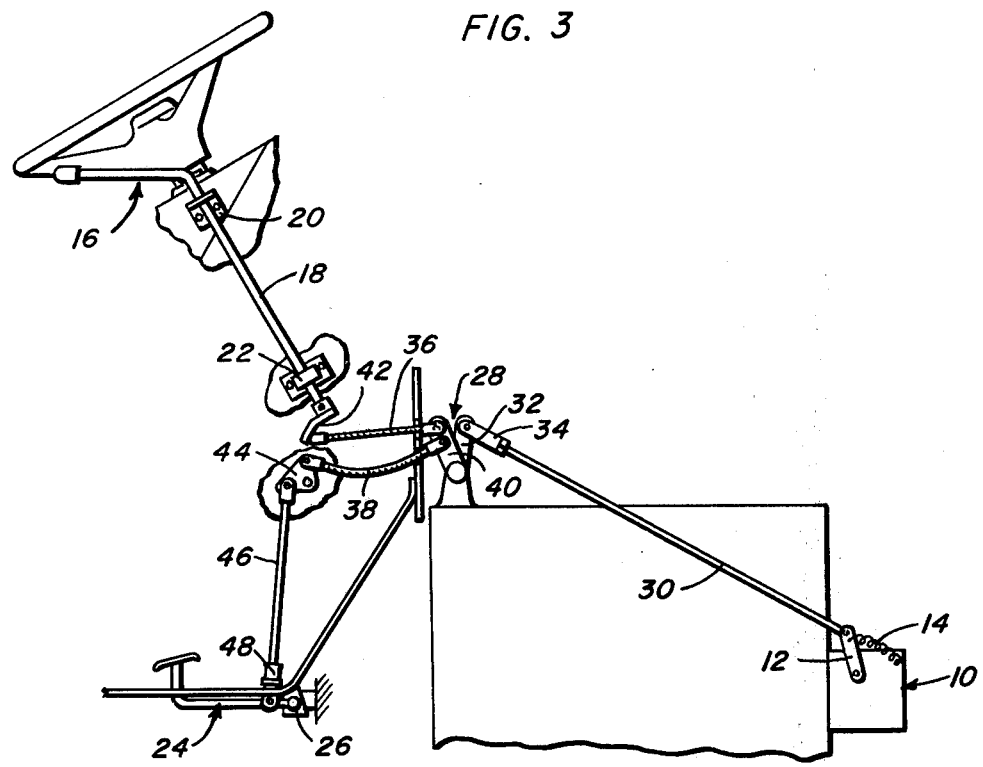
FIG. 3 is a schematic view of the control system with the hand throttle in full throttle position and the foot throttle in idle position.
Figure 4:
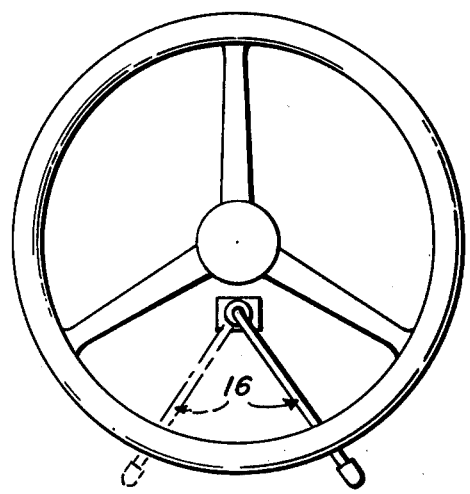
FIG. 4 is a top view of the hand throttle.

As will be appreciated from FIGS. 2 and 3, the governor setting can be actuated or increased by either throttle without interaction with or interference by the second throttle. In other words, upon a depression of the foot throttle 24, the tensile load introduced through the flexible cable link 38 will increase the governor setting with the flexible cable link 36 associated with the hand throttle merely going slack as noted in FIG. 2. By the same token, noting FIG. 3, upon a rotational adjustment of the hand throttle 16, the tensile force introduced through the associated flexible cable link 36 will increase the governor setting, the cable link 38 going slack, no motion being transmitted to the foot throttle 24 and the foot throttle position being maintained by the systems friction or a foot throttle return spring (not shown). When the foot throttle is actuated, a release thereof allows the governor spring 14 to return the foot throttle and linkage to the idle position of the governor. By the same token, upon a physical returning of the hand throttle to its forward position, or the forward position of the throttle mounted link 42, there will likewise be an automatic return of the governor to its idle position through the action of the governor spring.

Through the provision of the conventional friction device 22, the hand throttle 24, and hence the governor 10, can be retained in a predetermined adjusted position. As will be appreciated, upon a subsequent actuation of the foot throttle 24, this position can be overridden and the setting of the governor increased. However, upon a release of the foot throttle, the governor will return to the setting of the hand throttle.

While the system herein has basically been described for use in conjunction with a governor, it should be appreciated that other speed or power control units can be so regulated.

The foregoing is considered illustrative only of the principals of the invention and as numerous modifications and changes may readily occur to those skilled in the art, it is not desired to limit the invention to the exact construction and operation shown and described. Accordingly, all suitable modifications and equivalents may be resorted to, falling within the scope of the invention as claimed.

What is claimed as new is:

1. Control apparatus for a power control unit of a prime mover, said apparatus comprising first and second throttles, and first and second linkage means respectively extending from the first and second throttles to the power control unit for a selective actuation thereof, each of said linkage means including at least one link capable of transmitting only tension for a tension actuation of the control unit by either throttle independently of the other throttle.

2. The apparatus of claim 1 wherein said throttles respectively comprise a hand throttle and a foot throttle, and releasable friction lock means for maintaining the hand throttle in any adjusted position thereof.

3. The apparatus of claim 2 wherein said first linkage means comprises a first link engaged with and projecting from said hand throttle, a bell crank pivotally mounted remote from said first link, the associated link capable of transmitting only tension comprising a flexible non-extensible link engaged between the first link and the bell crank, and a third link extending from the bell crank to the power control unit.

4. The apparatus of claim 3 wherein said second linkage means comprises a first foot throttle link engaged with and projecting from the foot throttle, a second bell crank pivotally mounted remote from said foot throttle, said first foot throttle link engaging said second bell crank, the second linkage link capable of transmitting only tension comprising a flexible non-extensible link engaged between the second bell crank and the first mentioned bell crank.

5. A control system for an engine mounted variable setting governor comprising remote adjustably mounted hand and foot throttles, a bell crank pivotally mounted intermediate the throttles and governor, a single link extending between and engaged at the opposite ends with said bell crank and said governor for a variation in the governor setting in response to a pivotal movement of the bell crank, a pair of tension accommodating flexible links, each engaged at one end to said bell crank, and means connecting the second end of each flexible link to the hand and foot throttles respectively for a tensioning of each flexible link and a corresponding pivotal movement of the bell crank and change in the governor setting in response to a manipulation of the associated throttle.

6. The apparatus of claim 5 wherein said hand throttle is rotatably mounted, said means connecting the hand throttle to the associated flexible link comprising a rigid link fixed to and projecting outwardly from the hand throttle for rotation thereof, the outer end of this link being fixed to the associated flexible link.

7. The apparatus of claim 6 wherein the foot throttle is mounted for pivotal movement, the means engaging the foot throttle with the associated flexible link comprising a pivotally mounted bell crank engaged with the end of this link and a rigid link pivotally engaged with and extending between the foot throttle and the second mentioned bell crank.

8. The apparatus of claim 5 wherein the foot throttle is mounted for pivotal movement, the means engaging the foot throttle with the associated flexible link comprising a pivotally mounted bell crank engaged with the end of this link and a rigid link pivotally engaged with and extending between the foot throttle and the second mentioned bell crank.

* * * * *